Patented Dec. 26, 1922.

1,440,186

UNITED STATES PATENT OFFICE.

HENRY LIVINGSTONE SULMAN, THOMAS JAMES TAPLIN, JR., WALTER GEORGE PERKINS, AND HUGH FITZALIS KIRKPATRICK PICARD, OF LONDON, ENGLAND, ASSIGNORS TO HAROLD WADE, OF LONDON, ENGLAND.

TREATMENT OF ORES CONTAINING OXIDIZED COPPER COMPOUNDS.

No Drawing. Application filed August 22, 1921. Serial No. 494,381.

*To all whom it may concern:*

Be it known that we, HENRY LIVINGSTONE SULMAN, THOMAS JAMES TAPLIN, Jr., WALTER GEORGE PERKINS, and HUGH FITZALIS KIRKPATRICK PICARD, all subjects of the King of England, and all residing in London, England, have invented certain new and useful Improvements in the Treatment of Ores Containing Oxidized Copper Compounds, of which the following is a specification.

This invention consists in improvements in or relating to the treatment of ores containing oxidized copper compounds, for the removal of the contained metal therefrom by hydrometallurgical methods.

There are many ores which contain oxidized copper compounds such as oxide of copper or cuprite $Cu_2O$; copper carbonate or hydrated basic carbonate of copper such as malachite and azurite; silicate of copper such as chrysocolla $CuO.SiO_2.2H_2O$, or dioptase $CuO.SiO_2.H_2O$; oxychloride of copper such as atacamite $CuCl_2.3Cu(OH)_2$ and the like. Many copper ores contain two or more oxidized copper compounds.

For various reasons such ores have been difficult to treat economically and although leaching processes have been used in certain cases with a measure of success, direct leaching of the ore with solvents of copper is in many cases quite impracticable and in other cases open to considerable improvement.

We have now found that when an ore containing one or more oxidized copper compounds, in a suitably crushed state, is heated in a reducing gas to a comparatively low temperature (say between 150° C. and 400° C.) the copper oxide in combined form is substantially or almost completely reduced when it can readily be extracted by a solvent of copper; similarly certain associated copper compounds such as those containing chlorine are reduced to a state when the copper can readily be extracted by the solvent.

According to this invention a process for the treatment of an ore containing an oxidized copper compound comprises heating the crushed ore in a reducing gas to reduce the copper and thereafter submitting the ore to a leaching operation with a solvent of copper (such as aqueous ammonia or ammonium carbonate solution or preferably a mixture of these, in the presence of air or oxygen).

The ore after reduction is cooled but it is not necessary to cool in reducing gas because it is not essential to prevent the formation of films of oxide on the reduced copper. The cooled ore is submitted to a solvent preferably a solution of ammonia containing some ammonium carbonate. A suitable ratio is 0.8 part $CO_2$ to one part of $NH_3$. The solution is effected in the presence of air or oxygen. The copper is recovered from the ammoniacal solution by distilling off the ammonia. If evaporation be slow copper carbonate is precipitated but by using steam or boiling rapidly, black copper oxide is precipitated. The ammonia volatilized is passed into a condenser and the aqueous condensate is used for the next dissolving operation.

The invention is particularly applicable to the treatment of copper silicate ores which treatment has hitherto presented many difficulties, whether the treatment afforded be by smelting, by hydro-metallurgical methods, or by proximate (concentration) means. The ores are often too poor to be smelted economically, and in any event tend to produce slags very high in copper with but poor metal recoveries. Hydrometallurgical methods suffer from the disadvantage of the relative insolubility of the silicates of copper in most of the solvents which can be applied for the recovery of carbonate or other oxidized copper ores; or if the silicates be attacked by such solvents, they tend to produce finely divided or gelatinous silica which hinders filtration and often precludes complete attack of the mineral by the solvent. Both of these types of method as well as those dependent on concentration or on flotation (either direct or after sulphidizing) are also at the disadvantage that a slow gradation frequently exists in the mineralized particles between the copper silicate and pure silica; indeed it would appear as if the former is capable to some extent of solid solution in the latter and that silica particles may sometimes be only stained with copper silicate.

In our researches we have found that when copper silicate is heated in a suitable reducing gas such as hydrogen, producer gas, coal gas, etc., to a comparatively low temperature, usually less than 400° C. and initially even below 200° C. the copper oxide in combined form, as chrysocolla or other copper silicate, is almost completely reduced, largely independent of its mode of association with excess of silica. The so-treated particles of copper silicate are now of dull greyish bronze colour, the silica with which the copper oxide was previously combined being now apparently free, though intimately associated with what we assume to be almost molecularly fine metallic copper. The particles have become porous owing to the elimination of the combined water of the silicate, as also to the removal of the oxygen of the copper oxide by the reducing gas. The reduction takes place very rapidly and is usually complete in about 15 to 20 minutes for particles below one-twentieth of an inch in diameter. Investigation has also shown that advantage may be taken of the finely-divided state of the reduced metal and of the now porous nature of the treated particles to recover the metal by solution. The reduction temperature must be such as will not melt the reduced copper, nor permit it to alloy with other metals which may be present, nor should such temperature be high enough to "frit" the ore-gangue, and thus imprison the reduced copper, or surround it in such manner as will render it less accessible to the solvent liquor.

According to this invention, in a process for the treatment of ores containing copper silicate, such as chrysocolla, the crushed ore is heated in a reducing gas to reduce the copper, after which the ore is submitted to a leaching operation with a solvent of copper (such for example as aqueous ammonia or ammonium carbonate solution or preferably a mixture of these in the presence of air or oxygen).

The treatment of ores containing carbonate of copper by solution in ammonia is well known as also is the solubility of copper filings or native copper in ammonia, with or without certain ammonium salts, in presence of atmospheric oxygen. Neither of these steps is applicable to ores containing silicate of copper as such, and by our invention the glassy silicate is decomposed by reduction in such manner as to produce a porous product therefrom, containing finely divided metallic copper in a condition eminently suitable for recovery by solution, preferably in aqueous ammonia and/or ammonium carbonate, etc., in presence of air or oxygen.

We have also found that it is advantageous to apply the same process of preliminary reduction to other oxidized copper ores, such as copper carbonate ores.

For example, an oxidized-copper ore containing copper carbonate (malachite) as the main copper constituent was treated by the process above described and the extraction of the copper from the treated product by the ammonia solvent was found to be extremely effective and rapid, whereas the untreated or crude ore when submitted direct to the same extraction operation gave poor results; the treated ore yielded 93% of its total copper to the ammoniacal solvent in 10 hours, but the crude or untreated ore when leached direct with an equal volume of the same solvent gave up only 62.5% of its total copper in 43 hours.

In carrying out the solvent operation with ammonia or ammonium carbonate the necessary atmospheric oxygen may be supplied by the suitable exposure of the solvent liquor to air or by similar exposure of the pulp to air; the operation may be hastened if desired by entraining a current of air bubbles in the pulp of reducing ore and solvent, as for example by employing leaching apparatus of the "pachuca" type; where a current of air is employed the apparatus should be connected with a trap to intercept and recover any ammonia which may be volatilized in the air current.

While any carbonate of copper minerals accompanying the copper silicate minerals are similarly reduced to the metallic state, and the copper is recoverable by ammonia, any sulphides of copper present in the ore will remain substantially unaffected either by the reduction operation or by the ammoniacal solvent; if present such sulphides may be recovered by concentration, flotation or magnetic means, from the leached residue resulting from the treatment above described.

The method is further applicable to oxidized copper ores containing earthy carbonates or other strongly basic materials in the gangue, since these or other oxides do not destroy or inhibit the action of the ammoniacal solvent as they would destroy or interfere with acid solvents or with such solvents as solutions of ferric sulphate, ferric chloride, etc. But in cases where earthy carbonates or other bases are absent we may, if desired, use solvents such as ferric sulphate or ferric chloride for recovering the copper from the reduced silicate, etc. Usually, however we prefer to employ the ammoniacal solvent since the recovery of copper therefrom as high grade oxide is effected by the simple procedure of expelling the ammonia by heat; as the elimination of the ammonia proceeds the copper oxide separates as a granular product, whilst the ammonia or ammonium carbonate is condensed and recovered for re-use. Since the copper oxide is practically pure it is readily smelted to high grade copper by direct reduction.

An example of the invention may be cited in the treatment of an oxidized copper ore containing 6.49% of copper. Of this amount 0.75% was present as malachite, $CuCO_3.Cu$-

(HO)$_2$. about 0.2% as sulphide, the balance of the copper mineral being as chrysocolla, CuO.SiO$_2$.2(H$_2$O); the gangue was mainly siliceous but also carried the substantial amount of 34% of calcium carbonate. The material is representative of a class of copper ores which has hitherto proved economically intractable.

A sample of 100 grammes of ore crushed to pass a 30 mesh sieve I. M. M. was submitted to reduction in a rotary cylinder externally heated, through which a current of reducing gas (town-gas) was passed; water commenced to be eliminated at a temperature below 150° C. and reduction of the CuO then became rapid, being mainly effected in about 15 minutes, by which time the temperature had reached 385° C. When the temperature reached 410° C. the operation was stopped and the charge allowed to cool.

The cooled ore was now submitted to a leaching operation, using a sufficiency of a solution of ammonia and ammonium carbonate (containing about 7% total NH$_3$) to yield a mobile pulp, which was placed in a cylindrical vessel of the pachuca type, i. e., fitted with a central vertical tube immersed in the pulp through the lower end of which air bubbles were passed; this introduced the necessary oxygen supply and served to keep the pulp in circulation; an ammonia trap was supplied to recover any ammonia carried off by the air current.

After 6 hours the solution was drawn off, and the residual sands washed free from dissolved copper. The solution was boiled till free from ammonia and the resulting deposit of granular copper oxide was found to carry 5.218 grammes of copper. This is equivalent to an extraction of 80.4% of total copper in the ore, in the shape of a product reducible to pure metallic copper, by the simplest possible form of smelting.

Another example may be given.—A South African ore containing 9.46% Cu as a mixture of malachite and chrysocolla in a silicate gangue was reduced at a temperature of 300° C. in a current of coal gas. The resulting product (which now assayed 9.8% Cu) was mixed with a solution of ammonia and ammonium carbonate and agitated in an apparatus similar to that used in the last test. A total agitation period of two hours was allowed when the charge was filtered and the exhausted residues washed free from soluble copper. This residual material showed an assay value of 0.49% Cu, which is equivalent to an extraction of 95.5% of Cu in the ore. In treating ores containing oxychloride of copper such as atacamite CuCl$_2$.3Cu(OH)$_2$, we find that the copper during the reduction process is reduced partly to metallic copper and partly to cuprous chloride Cu$_2$Cl$_2$, some hydrochloric acid being evolved. In this operation care has to be taken to avoid heating too strongly so as to volatilize cuprous chloride. In a practical test some atacamite was heated to 300° C. in town coal-gas and of the total copper present in the mineral 97.5% remained behind in the furnace in the shape of a reddish powder. The remainder of the copper was in the form of a small sublimate but any volatilized chloride can be caught in water and easily recovered.

The copper in the treated ore is readily soluble in ammoniacal solvent. The copper chloride is dissolved as ammonium copper chloride. When the solution is boiled for the recovery of ammonia as above described, only the copper present as ammonium copper carbonate or ammonium cuprate comes down direct as copper oxide. The copper present as chloride remains dissolved. If the equivalent of a caustic or carbonated alkali be added either before boiling off the ammonia or after, the copper is thrown down as oxide. Any alkali can be used which gives a soluble chloride. If caustic lime be used, no excess of lime must be used because it would come down with the copper.

Again, if any sulphate of lime or other sulphate gets into the ammonia solution it may be necessary to add the equivalent of caustic or carbonated alkali to prevent the copper from being retained in solution as sulphate.

We merely instance the "pachuca" apparatus as one example of leaching plant, and may employ any form of percolation, agitation, or other extraction apparatus suitable for the hydro-metallurgical treatment of the reduced product we obtain in any given instance.

Our process may be modified to include re-oxidation of the metallic copper (after reduction) prior to the leaching operation. The oxygen necessary for the CuO dissolved by the solvent is here already contained in the copper product to be leached; the ore although re-oxidized is not rehydrated, nor must the re-formed copper oxide be permitted to recombine with silica. This will not take place if the reoxidation of the copper be effected at a moderate temperature.

Heretofore it has been found that in treating raw oxidized ores or raw ores containing native copper, by an ammonia solvent for the extraction of the copper, some ammonia tends to be adsorbed by and lost in the extracted ore-slimes; but according to this invention the disadvantage of such ammonia loss is greatly minimized by the inter-position of the reduction operation. Thus the residual slimes resulting from the ammonia extraction of a reduced ore as hereinbefore described, was found to carry only 0.7 lb. of NH$_3$ per ton of slime material.

It may be that certain ores containing oxidized copper compounds such as phosphate of copper would not, on reduction and treatment with ammoniacal solvent, give a complete or substantial recovery but a simple preliminary test will determine whether the present process is economically applicable to any particular ore.

What we claim as our invention and desire to secure by Letters Patent is:—

1. The hereindescribed process for the treatment of ores containing oxidized copper compounds which comprises heating the crushed ore in a reducing gas to reduce the copper and thereafter submitting the ore to a leaching operation with an ammoniacal solvent of copper.

2. The hereindescribed process for the treatment of ores containing oxidized copper compounds which comprises heating the crushed ore in a reducing gas to reduce the copper substantially to the metallic state and thereafter submitting the ore to a leaching operation with an ammoniacal solvent of copper.

3. The hereindescribed process for the treatment of ores containing oxidized copper compounds which comprises heating the crushed ore in a reducing gas to a temperature between 150° C. and 400° C. and thereafter submitting the ore to a leaching operation with an ammoniacal solvent of copper.

4. The hereindescribed process for the treatment of ores containing oxidized copper compounds which comprises heating the crushed ore in a reducing gas to reduce the copper and thereafter submitting the ore to a leaching operation with ammonium carbonate solution in the presence of oxygen.

5. The hereindescribed process for the treatment of ores containing oxidized copper compounds which comprises heating the crushed ore in a reducing gas to reduce the copper substantially to the metallic state and thereafter submitting the ore to a leaching operation with ammonium carbonate solution in the presence of oxygen.

6. The hereindescribed process for the treatment of ores containing oxidized copper compounds which comprises heating the crushed ore in a reducing gas to a temperature between 150° C. and 400° C. and thereafter submitting the ore to a leaching operation with ammonium carbonate solution in the presence of oxygen.

7. The hereindescribed process for the treatment of ores containing oxidized copper compounds which comprises heating the crushed ore in a reducing gas to reduce the copper and thereafter submitting the ore to a leaching operation with a solution of ammonia and ammonium carbonate in the presence of oxygen.

8. The hereindescribed process for the treatment of ores containing oxidized copper compounds which comprises heating the crushed ore in a reducing gas to reduce the copper substantially to the metallic state and thereafter submitting the ore to a leaching operation with a solution of ammonia and ammonium carbonate in the presence of oxygen.

9. The hereindescribed process for the treatment of ores containing oxidized copper compounds which comprises heating the crushed ore in a reducing gas to a temperature between 150° C. and 400° C. and thereafter submitting the ore to a leaching operation with a solution of ammonia and ammonium carbonate in the presence of oxygen.

10. The hereindescribed process for the treatment of ores containing copper silicate which comprises heating the crushed ore in a reducing gas to reduce the copper substantially to the metallic state and thereafter submitting the ore to a leaching operation with an ammoniacal solvent of copper.

11. The hereindescribed process for the treatment of ores containing copper silicate and other oxidized compounds of copper which comprises heating the crushed ore in a reducing gas to reduce the copper substantially to the metallic state and thereafter submitting the ore to a leaching operation with an ammoniacal solvent of copper.

12. A process for the treatment of an ore containing one or more oxidized copper compounds of the type described comprising heating crushed ore in a reducing gas for such a short time and at such a low temperature as to reduce the copper compound without melting or alloying the copper and without fritting the gangue, and so that the reduced material is obtained in a porous condition, and thereafter submitting the product to a leaching operation with an ammoniacal solvent of copper in the presence of air or oxygen.

In testimony whereof we have signed our names to this specification.

HENRY LIVINGSTONE SULMAN.
THOMAS JAMES TAPLIN (Junior).
WALTER GEORGE PERKINS.
HUGH FITZALIS KIRKPATRICK PICARD.